T. DOROSZUK.
BICYCLE SLEIGH.
APPLICATION FILED APR. 16, 1919.

1,324,342.

Patented Dec. 9, 1919.

INVENTOR
Tom Doroszuk
BY
Frank Lederman
ATTORNEY

UNITED STATES PATENT OFFICE.

TOM DOROSZUK, OF POLLEY, WISCONSIN.

BICYCLE-SLEIGH.

1,324,342.     Specification of Letters Patent.     Patented Dec. 9, 1919.

Application filed April 16, 1919. Serial No. 290,521.

*To all whom it may concern:*

Be it known that I, TOM DOROSZUK, a citizen of Poland, residing at Polley, county of Taylor, and State of Wisconsin, have invented certain new and useful Improvements in Bicycle-Sleighs, of which the following is a specification.

This invention relates to improvements in vehicles of the pedal propelled type, and has as its special object the provision of a vehicle simulative of a bicycle and similarly operated whereby a rider may advance over the surface of ice or snow at a relatively high speed.

A further object is to provide means whereby the tractional effect may be increased or diminished at will, permitting the vehicle to glide upon a downwardly inclined surface or the traction wheel may be used as a brake when desired.

These and other like objects are attained by the novel construction and combination of parts hereinafter described, and shown in the accompanying drawings, forming a material part of this disclosure, and in which—

Figure 1:
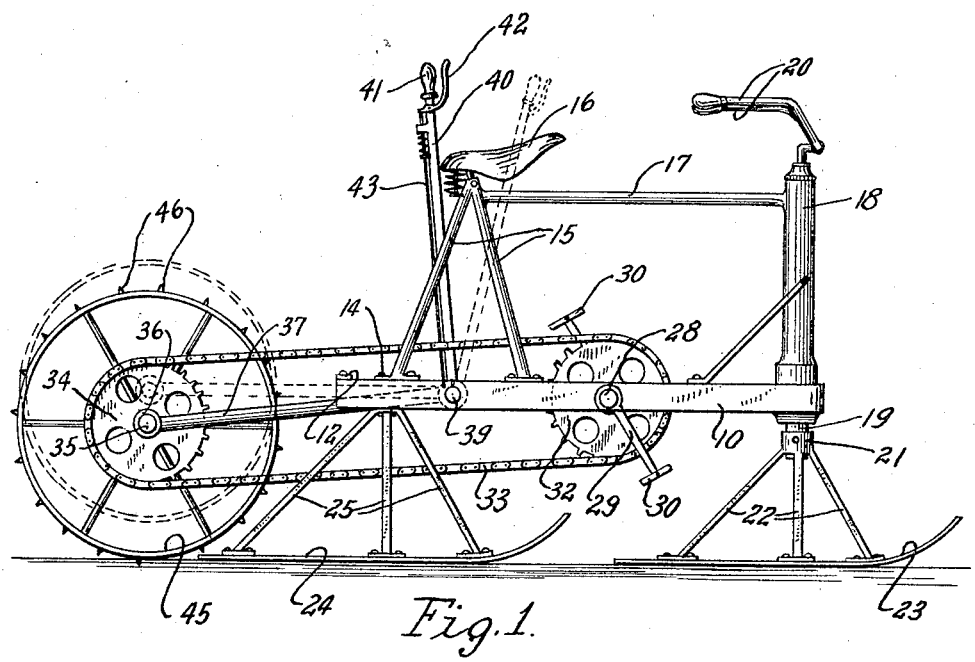
Figure 1 is a side elevational view showing a bicycle sled made in accordance with the invention.
Figure 2:
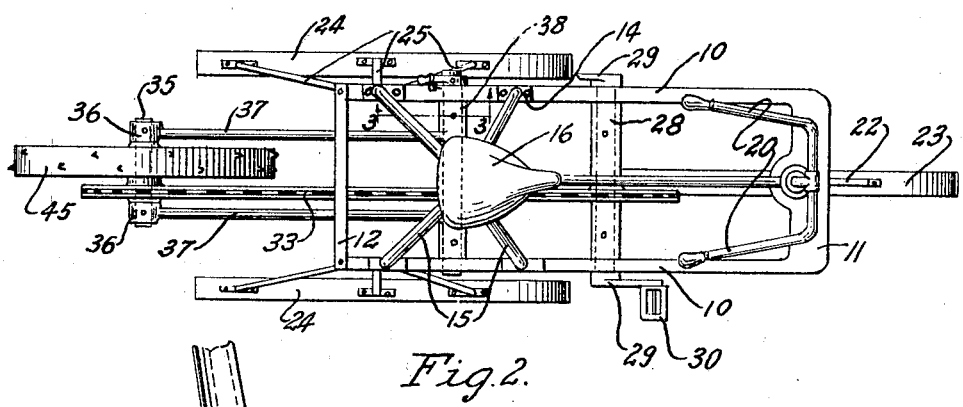
Fig. 2 is a top plan view thereof.
Figure 3:
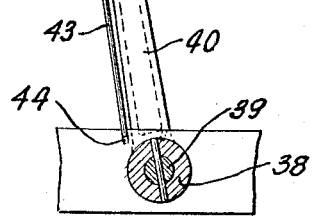
Fig. 3 is a fragmentary transverse sectional view taken substantially on line 3—3 of Fig. 2.

The frame of the machine is comprised of a pair of symmetrical side elements 10, integrally joined at the front 11, and similarly secured at the rear by a cross bar 12.

Fixed upon the upper surface of the side bars 10, are brackets 14, from which convergingly rise tubular elements 15, the same supporting a saddle 16 immediately below which is a horizontal bar 17, connecting with the column 18, containing the steering spindle 19, the same being operated by the forked handle 20 as usual.

Engaged with the lower end of the steering spindle 19 is a collar 21, and formed therewith are diverging supports 22, attached at their lower ends to the front runner 23, which obviously may be directed by actuating the handle bars 20.

Similarly, the rear runners 24, arranged in pairs, have extending between them and the frame 10, supports 25, thus rigidly securing the rear runners to the frame.

Mounted transversely in the frame, at a point midway of its center, is a shaft 28, having at its outer ends cranks 29 attached to pedals 30, adapted to be operated by the feet of the rider in an ordinary manner. Secured on the shaft 28 is a sprocket wheel 32 over which is trained a chain 33 communicating rotary motion to a similar sprocket wheel 34, mounted on a shaft 35, carried in bearings 36, supported by rigid arms 37 which are fixed upon a sleeve 38, rotatable upon a shaft 39, mounted in the frame 10, immediately below the seat 16, while at one side, preferably to the left, is secured upon the sleeve 38 a lever 40, having an operating handle 41.

Pivoted on the upper end of the lever 40 is a detent handle 42 by which the rod 43 may be raised or lowered, the lower end of the rod engaging in recesses 44, formed in the bar 10 in such manner that as the lever 40 is oscillated on the shaft 39, the shaft 35 may be raised or lowered relative to the frame.

Rigidly engaged upon the shaft 35, between the bearings 36, is a traction wheel 45, having a plurality of extending spurs 46, adapted to engage with the surface in such manner that as the pedals are actuated by the feet of the rider, power is transmitted to the chain 33 causing the vehicle to advance over the surface, and it will be obvious that by the action of the lever 40, the traction wheel 45 may be raised or lowered in accordance with the surface so as to be impressed forcibly if the surface be hard, as ice or frozen snow, or completely raised when moving down an inclined surface, as a hill, when tractive effect is not required, it being apparent that the rim of the wheel 45 is normally in the same plane as the runners 23 and 24.

From the foregoing it will be seen that an easily operated vehicle of the bicycle order has been disclosed, which may be moved upon the surface of snow or ice in the manner of a bicycle it being propelled and steered in a similar manner.

Having thus described my invention what I claim as new, and desire to secure by Letters Patent, is—

In a bicycle sled, the combination with a frame and the recessed side elements thereof, a pair of runners rigidly secured to the frame below and at the rear, a dirigible runner at the front, a seat mounted on said frame, steering handles operatively engaged with said dirigible runner whereby it may be moved in any direction, a shaft mounted transversely in said frame, a sprocket on said shaft, pedals adapted to operate said shaft, a second shaft mounted transversely in the frame, a sleeve thereon, arms extending rearwardly from said sleeve, bearings at the ends of said arms, a rear shaft mounted in said bearings, a sprocket wheel on said rear shaft, flexible connections between said sprocket wheels whereby said rear shaft may be driven, a traction wheel rigid on said rear shaft alongside the last named sprocket, a lever secured to said second shaft, a spring controlled sliding rod secured parallel to said lever and adapted to enter with its lower end the recesses of said side elements, and a detent handle for raising and lowering said rod, whereby said traction wheel may be raised or lowered relative to the plane of said runners.

In testimony whereof I have affixed my signature.

TOM DOROSZUK.